United States Patent [19]

Lee

[11] Patent Number: 5,669,345

[45] Date of Patent: Sep. 23, 1997

[54] DIRECT-INJECTION GASOLINE ENGINE

[75] Inventor: Yong-Gyun Lee, Kunpo, Rep. of Korea

[73] Assignee: KIA Motors Corporation, Seoul, Rep. of Korea

[21] Appl. No.: 668,637

[22] Filed: Jun. 21, 1996

[30] Foreign Application Priority Data

Apr. 19, 1996 [KR] Rep. of Korea .................. 96-11977

[51] Int. Cl.[6] ................................................ F02M 35/10
[52] U.S. Cl. ................................................. 123/184.42
[58] Field of Search .................... 123/184.42, 184.47, 123/184.49, 184.57, 184.29, 294

[56] References Cited

U.S. PATENT DOCUMENTS

| 3,457,904 | 7/1969 | Roberts | 123/184.42 |
| 4,722,307 | 2/1988 | Okuno et al. | 123/184.49 |
| 5,129,367 | 7/1992 | Lee et al. | 123/184.42 |

*Primary Examiner*—Marguerite McMahon

[57] ABSTRACT

A direct-injection gasoline engine comprising: a cylinder block; a crank case, mounted in the lower part of the cylinder block; a cylinder head, mounted to the top of the cylinder block; head covers, formed to the top of the cylinder head; a crank shaft formed in a crank chamber, formed between the cylinder block and the crank case; a piston formed in the cylinder block, with an eddy-current producing part in its upper surface; a connecting rod 4, the ends of which connect the piston and crank shaft and converts the alternating motion of the piston into a rotating motion; an ignition plug, formed in the middle of the cylinder head; a fuel injector, which sprays fuel into a combustion chamber; an exhaust port, formed on the other side of the cylinder head; an exhaust valve, for opening and closing the exhaust port; a suction port, formed on one side of the cylinder head; a suction valve, which opens and closes the suction port; a pair of cam shafts, each installed in the head covers for operating the suction valve and exhaust valve; and a surge tank, directly connected to the suction port and mounted to the central part of the head covers.

5 Claims, 4 Drawing Sheets

DIRECT-INJECTION GASOLINE ENGINE

FIELD OF INVENTION

The present invention relates to a direct-injection gasoline engine, and more particularly, to a direct-injection gasoline engine in which a suction port and surge tank are connected, and which has a piston with an eddy-current producing part extending from its upper end.

PRIOR ART

Generally, an engine of a vehicle converts chemical energy into mechanical energy. This mechanical energy is transferred to a driving apparatus, thus providing the driving force for a vehicle. According to the type of fuel used, engines are classified into two main types: gasoline engines and diesel engines.

In diesel engines, air is first sucked inside the combustion chamber. Afterwards, it is compressed to a high temperature and pressure, and then gas is sprayed into the combustion chamber through a fuel injector formed on a cylinder head. The mixture of fuel with air is spontaneously ignited under high-pressure. Alternating motion of the piston is created by the pressure caused by combustion of the mixture, and this motion is converted to a rotating movement of the crank shaft, resulting in the creation of engine driving force.

Gasoline engines are engines which use gasoline having a high level of volatility. Air and gasoline are mixed at a ratio of 14:1 to 15:1 in a carburettor. This mixture is supplied to a combustion chamber through a suction manifold, and after it is compressed, the mixture is ignited or combusted by an ignition plug causing an explosion. The pressure from the combustion of the mixture causes the alternating motion of a piston, and the motion of the pistons is then converted to a rotating movement of a crank shaft. From this conversion, engine driving force is created.

However, the structure of the gasoline engine as described above is complicated. Apparatuses that ignite fuel and peripheral parts for maintaining an adequate air compression ratio are mounted to the cylinder head, and during combustion, these parts are altered in shape and are damaged due to the heat produced in the process.

Accordingly, to remedy the above problems, a direct-injection gasoline engine having a changed structure in the cylinder head area has been developed. This direct-injection gasoline engine has a fuel injector mounted on the cylinder head as in the diesel engine. As a result, fuel is sprayed into the combustion chamber immediately, prior to, or during an intake stroke, and is mixed with air sucked into the combustion chamber through the suction port, forming a fuel and air mixture in the combustion chamber. Also, at the end of a combustion stroke, the mixture is ignited by an ignition plug, thus creating the pressure of combustion to provide the engine's driving force.

This direct-injection gasoline engine as mentioned above is illustrated in FIG. 1.

In FIG. 1, a cylinder head 10 is provided on the upper part of a cylinder block 2. A combustion chamber 3 is formed inside a cylinder bore 2a above a piston 6. A suction port 11 communicates with the combustion chamber 3 through a suction valve 12. The suction port 11 is connected to one end of a suction manifold 31, and to the other end of the suction manifold 31, a surge tank 18 is connected. The suction valve 12 is installed between the suction port 11 and combustion chamber 3, and open and closes the suction port to control the flow into the combustion chamber 3. A fuel injector 13 is installed on the side of the cylinder head 10 in which the suction valve 12 is mounted. Furthermore, in the central part of the combustion chamber 3, off to one side of the cylinder head 10, an ignition plug 14 is installed. Installed farther off to that side of the cylinder head is an exhaust port 15 that is connected with an exhaust manifold. An exhaust valve 16 is installed between the exhaust port 15 and combustion chamber 3, and open and closes the exhaust to control the flow out of the combustion chamber 3.

Generally, the suction port 11 is formed vertically, so that the air that is sucked into the combustion chamber 3 through the suction port 11 flows into the combustion chamber 3 in a tumbling motion by its vertical flowing in the suction port 11.

The piston 6 is installed inside the cylinder bore 2a so as to be able to undergo an alternating motion. The piston 6, in its lower portion, is connected to a connecting rod 4, which is in turn, connected to a crank shaft 5. A groove 6A is formed on the upper face of the piston 6 for the purpose of creating an eddy current to aid in the mixture of air and fuel.

In this direct-injection gasoline engine 1, air is sucked into the combustion chamber 3 through the suction port 11 and is mixed with fuel, which is directly sprayed in the combustion chamber 3 by the fuel injector. Thus the air and gas mixture is formed in the combustion chamber 3. As illustrated in FIG. 2, during the combustion stroke, if the piston 6 moves upward, the mixture inside the combustion chamber 3 flows following the circumference of the groove 6A, formed on the upper face of the piston 6. The mixture moves toward the ignition plug 14 and an eddy current is created by the movement of the mixture flowing along groove 6A. As a result, the mixture of air and gas becomes equally mixed. Hence, the mixture, which moves in the direction of the ignition plug 14, is easily ignited.

As a result, this direct-injection gasoline engine 1, has high heat efficiency. The structure of the cylinder head is also simple, and alteration of shape and damage to parts, caused by the heat of the engine 1 is reduced. Furthermore, because the air fuel ratio is maintained to an adequate level by the control in the amount of fuel sprayed by the fuel injector 13, fuel consumption is reduced.

In this direct-injection gasoline engine 1, as only the cylinder head 10, in a general engine which uses a carburettor, is changed, the cylinder block 2 of the general engine can be used without any changes in the direct-injection gasoline engine 1. In other words, the same cylinder block 2 can be used for both the general and direct-injection gasoline engine 1.

In the above prior art direct-injection gasoline engine 1, however, the suction manifold 31, connected to the suction port 11, and the surge tank 18, connected to the suction manifold 31, protrude out from the top of the cylinder head to a great degree. Thus, the height of the direct-injection gasoline engine 1, which uses a common cylinder block 2, is extended to a greater degree than that of the general engine, becomes taller.

Hence, because the extended height, if the direct-injection gasoline engine 1 is installed in vehicles having limited engine room, there problems in accommodating it under a normal hood. The extended height of the engine also complicates the layout design of the other engine parts whereas in a general engine, it would not be the case.

In addition, in regards to the piston 6 installed in the cylinder of the direct-injection gasoline engine 1, there is the drawback that the groove 6A, formed in the upper face of the piston 6 and which creates an eddy current with the air and fuel mixture and directs this mixture so it flows toward the ignition plug 14, is difficult to manufacture. The result is a reduction in the productivity of the piston 6.

SUMMARY OF THE INVENTION

The present invention has been made in an effort to solve the above mentioned problems.

It is an object of the present invention to provide a direct-injection gasoline engine which installs easily in the space provided in a body of a vehicle, and whose height is minimized by directly connecting the suction port and surge tank and by eliminating the suction manifold.

Another object of the present invention is to provide a direct-injection gasoline engine which is easy to manufacture, and which includes a piston with an eddy-current producing part extending from its upper end which can improve the ignition rate of the mixture of air and gas.

In the direct-injection gasoline engine according to the present invention, a suction port and a surge tank are directly connected. As a result, the suction passage is shortened, and the engine's height is able to be minimized. It is preferable that the suction port is formed vertically so that tumble flow can be created in air that is sucked in. Also, it is preferable that the surge tank is mounted in the middle of head covers, and that the upper part of the surge tank does not protrude past them.

The direct-injection gasoline engine of the present invention also includes a piston having formed an eddy-current producing part by extending a portion of its upper end.

The eddy-current producing part is formed on the piston's upper surface by forming a slightly slanted portion of the piston's upper end starting from one side of the piston to a pre-determined point, and then forming a sharply protruding portion starting from the predetermined point to the other side of piston's upper surface.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Preferred embodiments of the present invention will now be described in detail with reference to the accompanying drawings.

Figure 4:
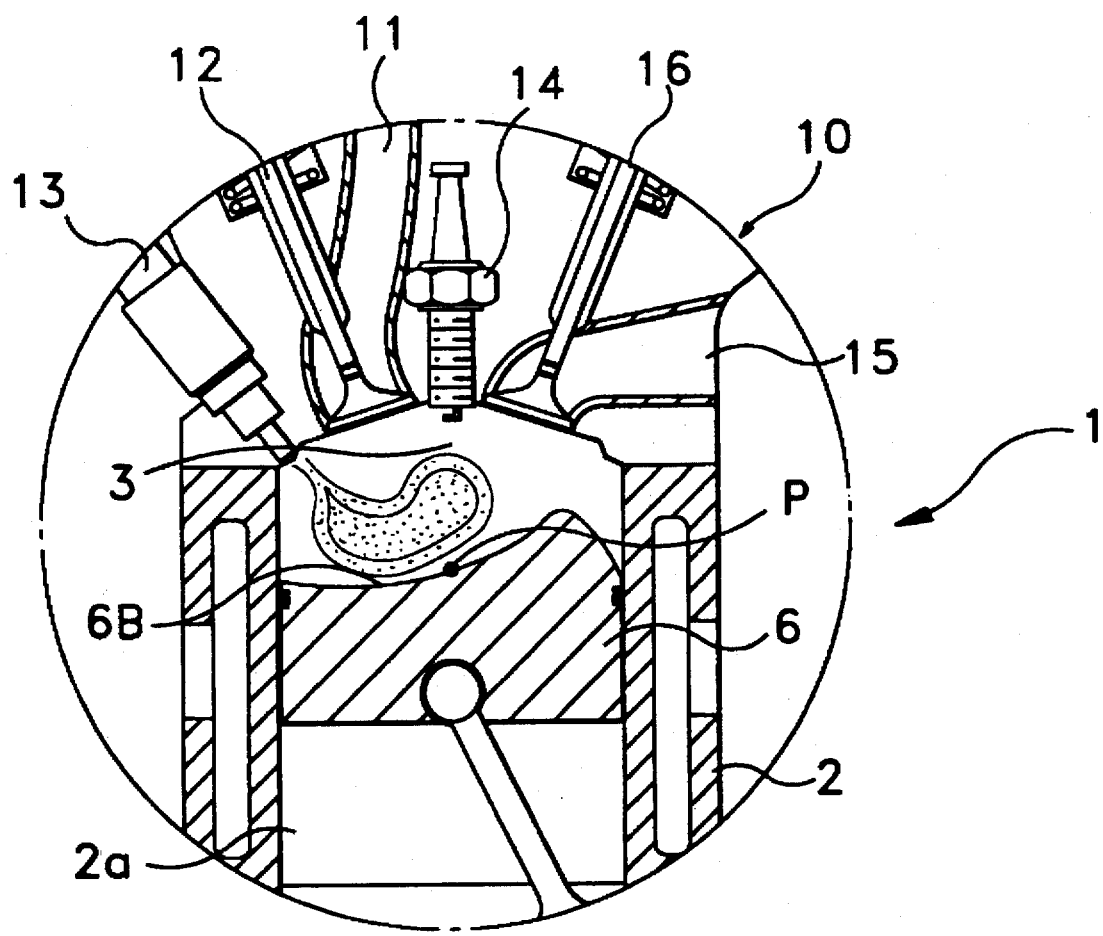
FIG. 4 is a view illustrating a flow movement of a mixture created by a piston of direct-injection engine according to the present invention.

A direct-injection engine according to the present invention is illustrated in FIG. 4.

Figure 1:
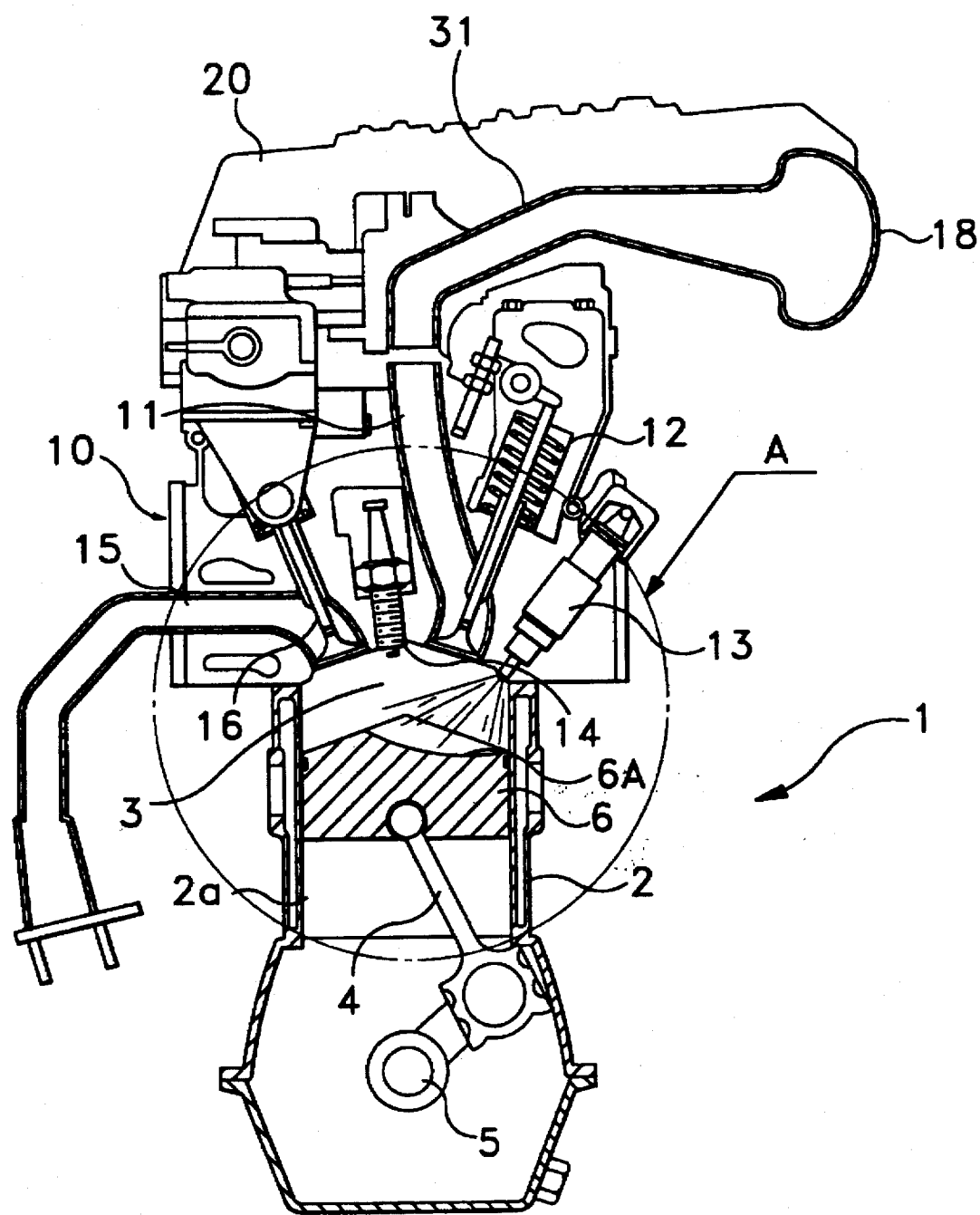
FIG. 1 is a sectional view of the prior art direct-injection engine.
Figure 2:
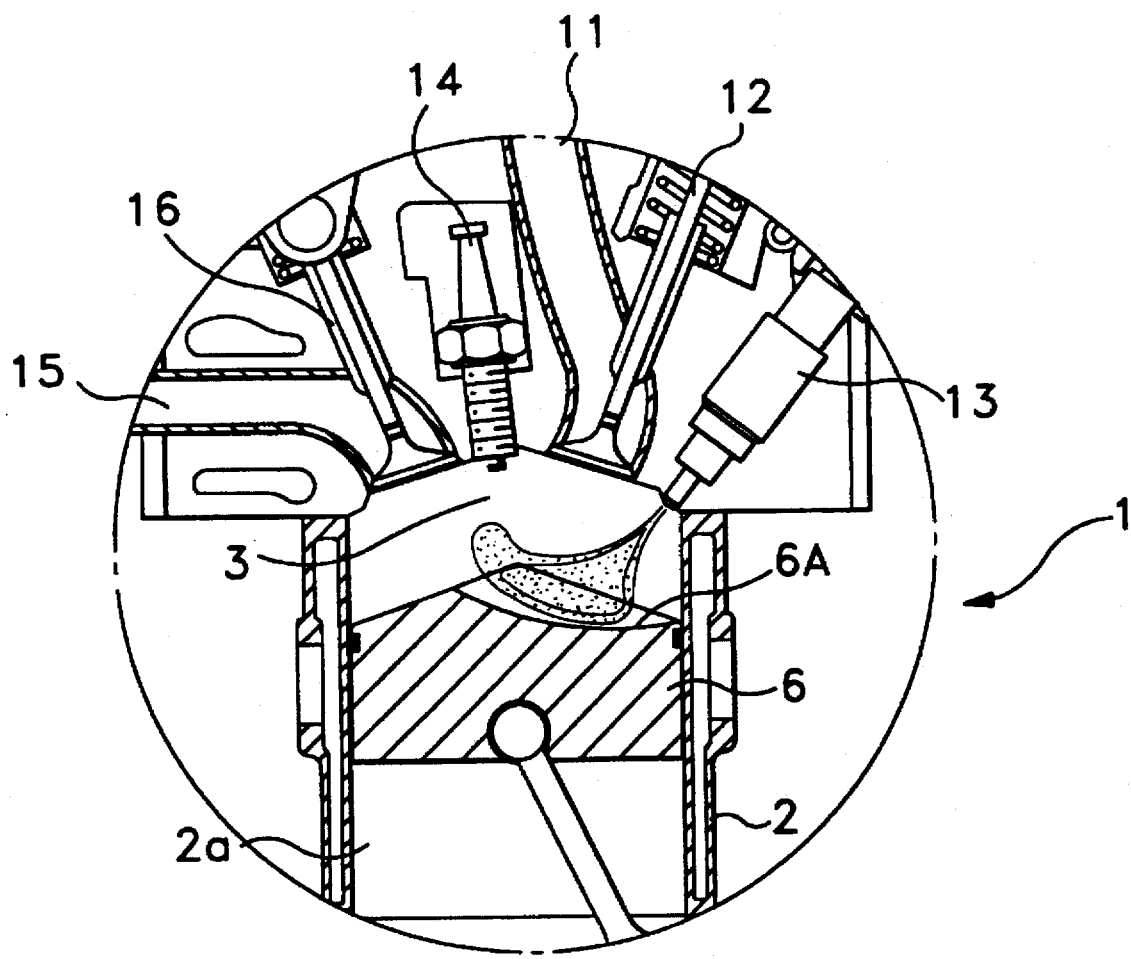
FIG. 2 is a view showing an operation status of a piston of the prior art direct-injection engine.
Figure 3:
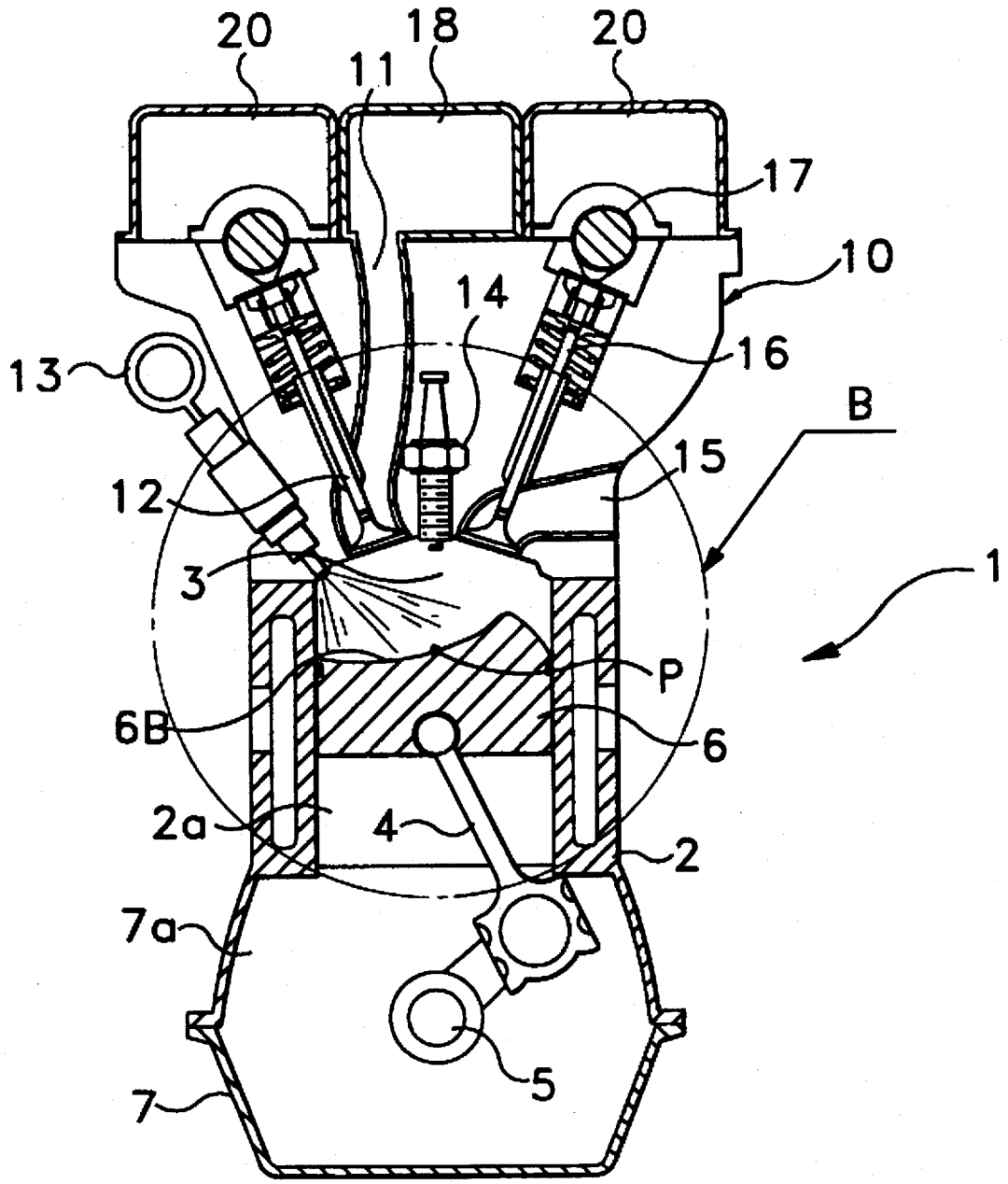
FIG. 3 is a sectional view of a direct-injection engine according to the present invention.

As illustrated in FIG. 3, a direct-injection engine according to the present invention includes: a cylinder block 2, having formed a bore 2a; a crank case 7, mounted in the lower part of the cylinder block 2 and in which a crank chamber 7a is formed; a cylinder head 10, mounted to the top of the cylinder block 2; and head covers 20, formed to the top of the cylinder head 10. A crank shaft 5 is formed in the crank chamber 7a, and a piston 6 is formed so as to make an alternating motion on the crank shaft 5. A connecting rod 4 connects the piston 6 and crank shaft 5. A combustion chamber 3 is formed in the cylinder bore 2a above the piston 6. On one side of the cylinder head 10, a suction port 11 is formed communicating with the combustion chamber 3 through the suction valve 12, and the other end of the suction port 11 is connected with a surge tank 18. The suction valve 12 is formed in the space between the suction port 11 and combustion chamber 3 so as to open and close their connection, and a fuel injector 13 is formed on the far side of the cylinder head 10, adjacent to the suction valve. Also, an ignition plug 14 is formed in the central part of the cylinder head 10, and on the other side of the cylinder head 10, an exhaust port 15 is formed, connected to an exhaust manifold. An exhaust valve 16 is formed in the space between the exhaust port 15 and combustion chamber 3 so as to open and close this connection. A surge tank 18 is installed in the upper part of the cylinder head 10, and head covers 20 are formed surrounding the surge tank 18. Cam shafts 17 are formed inside each of the head covers 20 which operate the suction/exhaust valves 12 and 16.

The suction port 11 is formed vertically so that the air, which is sucked into the combustion chamber 3 through the suction port 11, flows vertically, creates a tumble flow motion. Also, the surge tank 18, formed to the upper part of the cylinder head 10 does not protrude past the head covers 20 and minimizes the height of the engine 1.

It is important note that because the suction port 11 and surge tank 18 are directly connected to each other, even if the length of the suction passage becomes shortened, there is no loss of actual power outputted by the engine 1 caused by the reduction in pulsation effect. It is because in the direct-injection gasoline engine 1, fuel sprayed in the combustion chamber 3 as a liquid by the fuel injector 13, is evaporated in the combustion chamber 3. The temperature of the air is thus reduced, and accordingly, the volume of air is reduced (roughly 10%) which results in more air being sucked into the combustion chamber 3. Also, as the valves' open and closing times are controlled, controlling the overlap time of the suction/exhaust valves 12 and 14, effects for obtaining appropriate pulsation effect of the suction manifold are able to be obtained. In addition, as there are normally 2 suction valves 12 for each cylinder which are separately controlled, similar effects can be obtained. Therefore, the height of the direct-injection engine 1 of the present invention can be minimized without a reduction in engine capability due to the shortening in suction passage length.

Furthermore, the piston 6, installed in the cylinder bore 2a, has formed an eddy-current producing part 6B is formed on the piston's upper surface by forming a slightly slanted portion of the piston's upper end starting from one side of the piston to a predetermined point (P), and then forming a sharply protruding portion starting from the pre-determined point (P) to the other side of piston's upper surface.

Accordingly, as illustrated in FIG. 4, in the compression stroke, when the piston 6 is moving upward, the eddy-current producing part 6B mixes the mixture more equally by its producing of an eddy current of the mixture of fuel, sprayed from the fuel injector 13, and air, sucked in through the suction port 11. At the same time, because the strength of flowing movement of the mixture of air and fuel is increased, the mixture can easily move toward the ignition plug 14, resulting in improved ignition and combustion of the mixture.

In the engine according to the present invention of the above, because the height of the engine is minimized, difficulties in the layout design of engine parts caused by limited engine room are resolved, and the sphere of application of the direct-injection engine which uses a common cylinder block is enlarged.

Also, by the adoption of an eddy-current producing part extending from its upper part by the piston of the engine according to the present invention, ease of production is improved, which reduces manufacturing costs, and because the flow movement of the mixture of air and gas is improved, there is an improvement in the ignition and combustion of the mixture.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A direct-injection gasoline engine comprising:

a cylinder block;

a crank case, mounted in the lower part of the cylinder block;

a cylinder head, mounted to the top of the cylinder block;

head covers, formed to the top of the cylinder head;

a crank shaft formed in a crank chamber, formed between the cylinder block and the crank case;

a piston formed in the cylinder block, with an eddy-current producing part in its upper surface;

a connecting rod, the ends of which connect the piston and crank shaft and converts the alternating motion of the piston into a rotating motion;

an ignition plug, formed in the middle of the cylinder head;

a fuel injector, which sprays fuel into a combustion chamber;

an exhaust port, formed on one side of the cylinder head;

an exhaust valve, for opening and closing the exhaust port;

a suction port, formed on the other side of the cylinder head;

a suction valve, which opens and closes the suction port;

a pair of cam shafts, each installed in the head covers for operating the suction valve and exhaust valve; and a surge tank, directly connected to the suction port and mounted to the central part of the head covers.

2. The direct-injection gasoline engine according to claim 1, wherein the suction port is formed vertically.

3. The direct-injection gasoline engine according to claim 1, wherein the upper part of the surge tank is mounted so as to not protrude past the head covers.

4. The direct-injection gasoline engine according to claim 1, wherein the piston has an eddy-current producing part extending from its upper end on its upper surface.

5. The direct-injection gasoline engine according to claim 4, wherein the eddy-current producing part is formed on the piston's upper surface by forming a slanted portion of the piston's upper end starting from one side of the piston to a pre-determined point, and then forming a sharply protruding portion starting from the predetermined point to the other side of piston's upper surface.

* * * * *